April 4, 1961 A. BUISSON 2,978,259
VEHICLE COUPLING SYSTEM
Filed Dec. 7, 1959 2 Sheets-Sheet 1
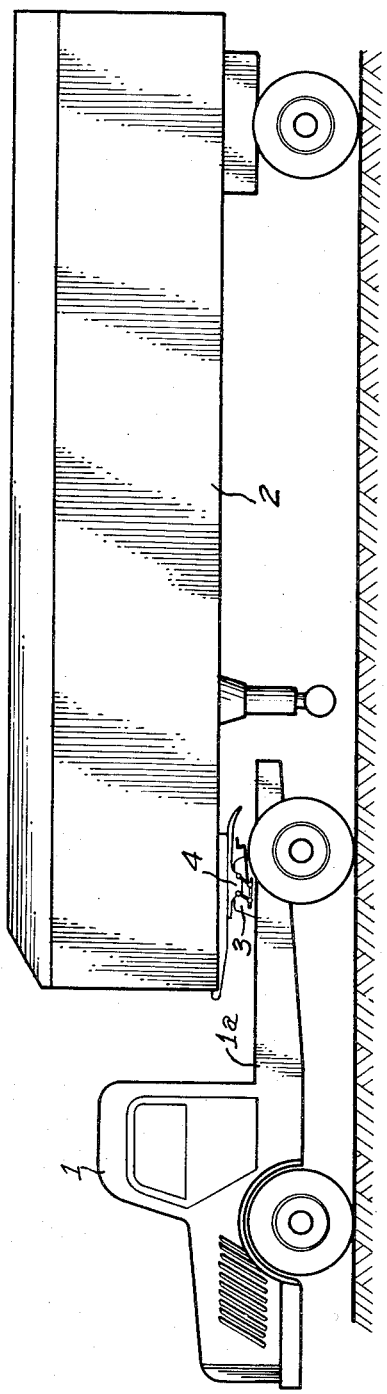

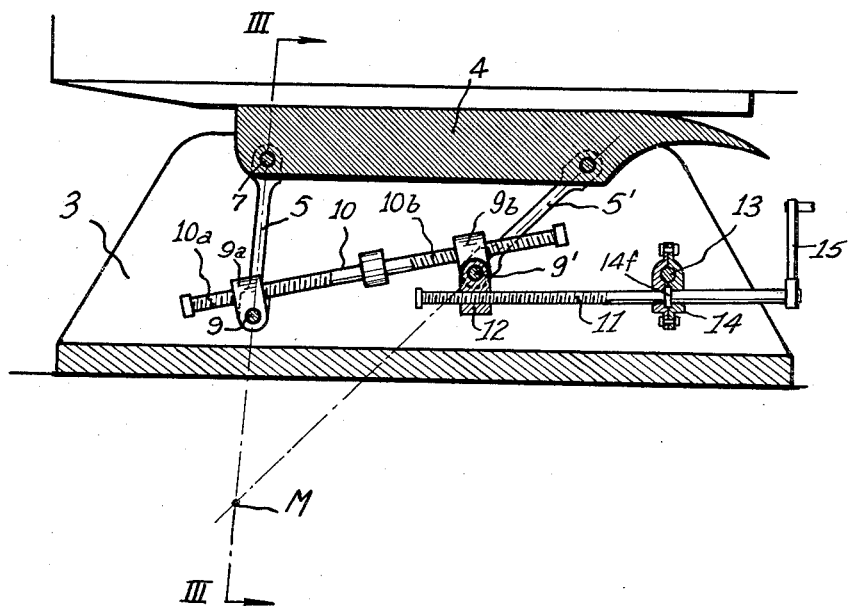

United States Patent Office 2,978,259
Patented Apr. 4, 1961

2,978,259
VEHICLE COUPLING SYSTEM

André Buisson, Paris, France, assignor to Societe Anonyme dite: Societe Lorraine des Anciens Etablissements de Dietrich & Cie de Luneville, a society of France Filed Dec. 7, 1959, Ser. No. 857,922

Claims priority, application France Dec. 9, 1958

13 Claims. (Cl. 280—405)

This invention relates to vehicle coupling systems, and more especially though not exclusively to load-transmitting couplings between a tractor and a semi-trailer.

Coupling systems for tractor and semi-trailer combinations have been proposed wherein the linkage interconnecting the tractor platform and the overlying semi-trailer surface is so designed as to constrain the semi-trailer and tractor to assume movement of relative rotation in a vertical plane about an ideal transverse axis representing the instantaneous center of rotation between the two vehicles, and which axis is not constituted by any physical pivot. Such coupling systems are advantageous since they make it possible by suitable design to position the said center of rotation at a desirable position that would not be otherwise accessible as a convenient location for a pivot shaft. The position of this center or axis of rotation is selected with regard to the most probable, or average, loading and load distribution of the trailer vehicle. It would, however, be desirable if the position of the instantaneous center of rotation between the coupled vehicles could be adjusted at will in conformity with the actual loading at any given time.

It is an object of this invention to achieve this result.

A related object is to provide improved means for controlling the load distribution between the wheel axles of a combination of coupled vehicles such as a tractor and a semi-trailer.

The loading of the trailer may vary greatly from time to time, and the distribution of the load as well. Since safety considerations require that the unitary load per wheel axle shall not exceed a prescribed limit, and for other similar reasons, it would be extremely desirable to provide a simple and effective means of varying the load distribution in the tractor-and-trailer combination without having to unload and reload the trailer should such distribution prove unsatisfactory or dangerous, say on the road. An object of the invention therefore is to provide a coupling system which will at the same time provide a convenient means of load distribution adjustment.

According to an aspect of the invention there is provided a system for coupling two vehicles, e.g. a tractor and a semi-trailer one of said vehicles having a portion overlying a portion of the other, which system comprises at least one pair of front links and at least one pair of rear links disposed in the space between said portions of the vehicles, means interpivoting first ends of the links of each pair about a related transverse axis and means interpivoting the other ends of the respective links of the pair to the respective vehicles about normally coaxial transverse pivots, and means for adjusting the longitudinal spacing between the transverse axes relating to both pairs.

Preferably the system comprises two pairs of front links and two pairs of rear links symmetrically related on opposite sides of the longitudinal vertical midplane of the vehicles.

In addition to the means for adjusting the spacing between the transverse axes as just mentioned, means are preferably also provided for bodily adjusting the position of said axes with respect to one of the vehicles, such as the tractor.

As will become more clearly apparent from the specific description to follow, the front and rear links define an ideal intersection point which is the instantaneous center of rotation of the trailer relatively to the tractor, and the adjusting means mentioned above make it possible to control the position of such center as desired, and thereby to control the load distribution applied to the axles of the tractor-trailer combination.

Moreover, the coupling system of this invention can easily and advantageously be associated with shock absorbing apparatus of the type disclosed for example in U.S. Patent 2,809,851, thereby to provide a combined coupling, load distribution-adjusting and shock-absorbing system of greatly improved character.

An exemplary embodiment of the invention will now be described for purposes of illustration but not of limitation and with reference to the accompanying drawings, wherein:

Fig. 1 is a general small-scale side view of a tractor and semi-trailer combination coupled by way of a system according to this invention, Fig. 2 is a side view, partly in section, showing the coupling system on a larger scale, and Fig. 3 is a transverse cross section on the plane III—III of Fig. 2.

As shown in the drawing the invention is applied to the coupling of a tractor vehicle 1 with a semi-trailer 2. Secured on the platform 1a of the tractor is a cradle having transversely spaced upstanding flanges 3. Secured to the under side of the front portion of the trailer is a fifth wheel-plate, saddle or bearer member 4. The improved coupling system to be described serves to connect the cradle 3 and bearer 4 for pivotal movement about a selected transverse axis.

This coupling system comprises a number of links which are symmetrically arranged on opposite sides of the vertical fore-aft plane of the vehicles as is apparent from Fig. 3; hence symmetrical elements on either side of this plane are referred to by the same numerals. A pair of forward inner links 5 have their upper ends pivoted to the front end of bearer plate 4 by way of a transverse shaft 7. A pair of forward outer links 6 equal in length to the links 5 have their upper ends pivoted to the cradle flanges 3 by stub-shafts 8, normally aligned with the shaft 7. The lower ends of all four forward links, both the inner 5 and the outer 6, are pivotally interconnected through a common forward transverse shaft 9. Similarly, a pair of rear inner links 5' have their upper ends pivoted to the rear end of bearer 4 by way of a transverse shaft and a pair of rear outer links 6' equal in length to the inner links have their upper ends pivoted to the cradle flanges 3 by way of stub-shafts (not shown) aligned with the pivotal shaft of rear inner links 5'. The lower ends of all four rearward links, both the inner 5' and the outer 6', are pivotally interconnected by a common rear shaft 9'. It will be understood that the arrangement is such that normally, i.e. in the absence of acceleration forces, all four forward links 5, 6 are constrained to lie in a common plane, and similarly all four rear links 5', 6' are constrained to lie in another common plane. Means are provided for adjusting the angular relationship between the two planes thus defined, as well as for separately adjusting the angular relationship of the entire linkage system with respect to the mounting cradle or bracket 3.

To adjust the angle formed between the forward and the rear links, there is provided a turnbuckle device comprising a shaft 10 having opposite screw threads 10a and 10b formed on it, engaging respective threaded shackles 9a and 9b secured on the forward shaft 9 and the rear shaft 9'. Thus rotation of the dual screw-shaft 10 through any suitable means not shown, will act to move the shafts 9 and 9' towards and away from each other as required, thereby to adjust the angle between the front links and the rear links.

To adjust bodily the angular position of the linkage system and the bearer plate 4 with respect to the cradle 3, there is provided a further screw device comprising a screw shaft 11 freely journalled in an arm 14 which in turn is freely rotatable about a fixed shaft 13 secured across the cradle flanges 3 towards the rear of the coupling assembly. A flange 11f on shaft 11 is held between the identical halves which constitute arm 14 and are bolted together at top and bottom in embracement of shaft 13 and the flange. The screw-threaded part of shaft 11 cooperates with an internally threaded nut or shackle 12 which is mounted for free rotation about the rear transverse shaft 9'. The rearwardly projecting end of screw shaft 11 has a crank 15 secured to it. Thus it will be seen that regardless of the angular position of the trailer and linkage assembly crank 15 can be easily rotated to control such bodily angular position.

In operation, before departure of the loaded tractor trailer combination, the angular relation between front links 5, 6 and rear links 5', 6' is adjusted by rotation of the turnbuckle shaft 10 until the pivot shafts 9 and 9' have been brought to a desired spacing from each other. At this time the ideal point of intersection M between the extended midlines of the forward and rear links (as indicated in Fig. 2) is fixed relatively to the trailer. This point of intersection (or rather line of intersection between the two aforementioned planes) represents the instantaneous center (or rather axis) of rotation of the trailer relatively to the tractor. Further to determine the precise position of this center M relative to the tractor, the crank 15 is rotated to adjust the fore-aft position of shaft 9' without deforming the linkage system.

It is noted that rotation of shaft 10 to adjust the spacing between pivot shafts 9 and 9' does not require the exertion of much muscular effort since as already indicated the pivot shafts such as shafts 7 and 8 of the inner and outer links are normally aligned in the absence of acceleration forces, road bumps and the like, as is the case when the vehicles are at a standstill or driving at a smooth and steady rate, so that the only resistance to be overcome on rotation of screw shaft 10 is the bearing friction of the said pivot shafts.

It will be understood that by selecting the position of the ideal pivotal center M in the manner just described, it becomes possible to control in an extremely simple, convenient and efficient way the distribution of loads on the axles of the vehicle combination.

Various modifications within the scope of the invention may of course be introduced into the invention and departures made from the structural details of the single exemplary embodiment shown and described, e.g. as regards the means for effecting the various angular adjustments in the system.

What I claim is:

1. A vehicle coupling system comprising two pairs of front links and two pairs of rear links, said pairs being symmetrical with respect to each other on opposite sides of a vertical longitudinal midplane of the vehicles, means interpivoting one end of the links of each pair to each other about a transverse axis, and means respectively pivoting the other ends of said links of each pair to the respective vehicles about normally coaxial transverse pivots, said front links lying in a plane which intersects a plane in which said rear links lie in a line below said transverse axes, and means for adjusting the longitudinal spacing between the transverse axes of said front and rear link pairs.

2. Vehicle coupling system comprising a front pair of links and rear pair of links, means interpivoting one end of the links of each pair to each other about a transverse axis, and means respectively pivoting the other ends of said links of each pair to the respective vehicles about normally coaxial transverse pivots, the plane in which said front links lie being intersected by the plane in which said rear links lie in a line below said transverse axes, means for adjusting the longitudinal spacing between the transverse axes of the respective pairs of links, and means for separately adjusting bodily the position of said axes with respect to one of the vehicles, both said adjustments being for the purpose of varying the position of said line of intersection.

3. A coupling system for a tractor and semi-trailer comprising a support on the tractor and a bearer on the underside of the trailer, a front pair of links and a rear pair of links, the links of each pair having one end pivoted to each other about a transverse axis and having their other ends respectively pivoted to said support and said bearer about transverse pivots, the plane in which said front links lie being intersected by the plane in which said rear links lie in a line below said transverse axes, and means for adjusting the longitudinal spacing between the transverse axes of the respective pairs of links, and means for separately adjusting the bodily position of said axes with respect to said support, both said adjustments being for the purpose of varying the position of said line of intersection.

4. A coupling system for a tractor and semi-trailer comprising a support on the tractor and a bearer on the underside of the trailer, two pairs of front links and two pairs of rear links, said pairs being symmetrical with respect to each other on opposite sides of a vertical longitudinal midplane, the links of each pair having their lower ends pivoted to each other about a transverse axis and having their upper ends respectively pivoted to the support and bearer about transverse pivots, said front links lying in a plane which intersects a plane in which said rear links lie in a line below said transverse axes, and means for adjusting the longitudinal spacing between the respective transverse axes for said front and rear link pairs in order to vary the position of said line of intersection.

5. In the system of claim 4, means for separately adjusting bodily the position of said axes with respect to the support.

6. A coupling system for a tractor and semi-trailer comprising two pairs of front links and two pairs of rear links, said pairs being symmetrical with respect to each other on opposite sides of a vertical longitudinal midplane, means interpivoting one end of the links of each pair about a transverse axis, and means pivoting the other ends of the links of each pair to the tractor and trailer respectively about normally coaxial transverse pivots, said front links lying in a plane which intersects a plane in which said rear links lie in a line below said transverse axes, and means determining the spacing between said transverse axes and the position of said line of intersection.

7. A coupling system for a tractor and semi-trailer comprising two pairs of front links and two pairs of rear links, said pairs being symmetrical with respect to each other on opposite sides of a vertical longitudinal midplane, a common transverse shaft interpivoting one end of all four links of both front pairs, and a further common transverse shaft interpivoting one end of all four links of both rear pairs, means pivoting the other ends of one link of all four pairs to the tractor, and means pivoting the other ends of the other links of all four pairs to the trailer, said front links lying in a plane which intersects a plane in which said rear links lie in a line below said transverse axes, and screw means for adjusting the spacing between said common transverse shafts in order to vary the position of said line of intersection.

8. The system claimed in claim 7 wherein said screw means comprise a rotatable shaft having reversely pitched screw portions, and a pair of arms rotatable on said respective transverse shafts and having threaded openings for the respective screw portions.

9. The system claimed in claim 7 further including means for adjusting bodily the position of said shafts with respect to the trailer.

10. The system claimed in claim 9 wherein said further adjusting means comprise a rotatable screw shaft, means rotatably mounting said screw shaft on the tractor, an arm rotatable on one of said common transverse shafts and having a threaded opening engaging said screw shaft.

11. Vehicle coupling system comprising a front pair of links and rear pair of links, means interpivoting one end of the links of each pair to each other about a transverse axis, and means respectively pivoting the other ends of said links of each pair to the respective vehicles about normally coaxial transverse pivots, the plane in which said front links lie being intersected by the plane in which said rear links lie in a line below said transverse axes, and means for adjusting the longitudinal spacing between the transverse axes of the respective pairs of links in order to vary the position of said line of intersection.

12. A coupling system for a tractor and semi-trailer comprising a support on the tractor and a bearer on the underside of the trailer, a front pair of links and a rear pair of links, the links of each pair having one end pivoted to each other about a transverse axis and having their other ends respectively pivoted to said support and said bearer about transverse pivots, the plane in which said front links lie being intersected by the plane in which said rear links lie in a line below said transverse axes, and means for adjusting the longitudinal spacing between the transverse axes of the respective pairs of links in order to vary the position of said line of intersection.

13. A vehicle coupling system as claimed in claim 1 having means for separately adjusting bodily the position of said axes with respect to one of the vehicles.

References Cited in the file of this patent

UNITED STATES PATENTS

| | | |
|---|---|---|
| 1,588,036 | Lawrence | June 8, 1926 |
| 2,809,851 | Beck | Oct. 15, 1957 |
| 2,863,674 | Baade | Dec. 9, 1958 |